(12) United States Patent
Consonni et al.

(10) Patent No.: US 11,189,396 B2
(45) Date of Patent: Nov. 30, 2021

(54) CABLE WITH LIGHTWEIGHT TENSILE ELEMENTS

(71) Applicant: Prysmian S.p.A., Milan (IT)

(72) Inventors: Enrico Maria Consonni, Milan (IT); Gianni Miramonti, Milan (IT); Luca Giorgio Maria De Rai, Milan (IT); Paolo Veggetti, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/337,809

(22) PCT Filed: Sep. 29, 2016

(86) PCT No.: PCT/EP2016/073197
§ 371 (c)(1),
(2) Date: Mar. 28, 2019

(87) PCT Pub. No.: WO2018/059685
PCT Pub. Date: Apr. 5, 2018

(65) Prior Publication Data
US 2019/0228876 A1 Jul. 25, 2019

(51) Int. Cl.
*H01B 9/02* (2006.01)
*H01B 7/18* (2006.01)
*H01B 7/04* (2006.01)

(52) U.S. Cl.
CPC .............. *H01B 7/182* (2013.01); *H01B 7/041* (2013.01)

(58) Field of Classification Search
CPC .................................. H01B 7/18; H01B 9/025
USPC ......................................... 174/102 R, 106 R
See application file for complete search history.

(56) References Cited

U.S. PATENT DOCUMENTS

| | | | | |
|---|---|---|---|---|
| 3,442,002 A * | 5/1969 | Geary, Jr. | ............... | B01D 63/02 29/450 |
| 3,842,584 A * | 10/1974 | Schmittman | ............ | D07B 1/02 57/216 |
| 3,980,808 A * | 9/1976 | Kikuchi | ................ | H01B 7/182 174/110 SR |
| 4,059,951 A | 11/1977 | Roe | | |
| 4,874,219 A | 10/1989 | Arroyo et al. | | |
| 5,503,783 A * | 4/1996 | Nakagawa | ............ | F16F 1/3665 264/29.2 |
| 7,285,726 B2 | 10/2007 | Bremnes | | |
| 9,627,100 B2 * | 4/2017 | Pourladian | ........ | H01B 13/0006 |
| 2007/0044992 A1 | 3/2007 | Bremnes | | |
| 2010/0048373 A1 | 2/2010 | Rochat | | |

(Continued)

FOREIGN PATENT DOCUMENTS

WO 2010075873 A1 7/2010

OTHER PUBLICATIONS

Agy, "High Strength Glass Fibers", Technical Paper, 2006, 12 pages.

(Continued)

*Primary Examiner* — Chau N Nguyen
(74) *Attorney, Agent, or Firm* — Slater Matsil, LLP (57) ABSTRACT

A cable has a tensile armor having a number of elongated polymeric tensile elements. At least one of the elongated polymeric tensile elements includes a bundle of high tensile fibers and a jacket tightly retaining the bundle of fibers. The elongated polymeric tensile elements are arranged with a lay loss of 1.5% at most. A method of manufacturing such a cable is also disclosed.

19 Claims, 5 Drawing Sheets

(56) References Cited

U.S. PATENT DOCUMENTS

| | | | | |
|---|---|---|---|---|
| 2011/0067881 A1* | 3/2011 | Blake | .................. | E21B 37/06 |
| | | | | 166/352 |
| 2012/0279750 A1 | 11/2012 | Lund et al. | | |
| 2013/0048373 A1* | 2/2013 | Fogg | .................. | H01B 7/045 |
| | | | | 174/70 R |
| 2014/0318858 A1 | 10/2014 | Pourladian et al. | | |
| 2019/0237224 A1* | 8/2019 | Heinemann | ............ | H01C 7/028 |

OTHER PUBLICATIONS

Wikipedia, "Young's modulus", retrieved from https://en.wikipedia.org/wiki/Young%27s_modulus, 11 pages.

Worzyk, Thomas, "Submarine Power Cables—Design, Installation Repair, Environmental Aspects", Springer, ISSN 1612-1287, Dec. 11, 2009, 3 pages.

Third Party Observation Against EP3520121, Nov. 18, 2019, 30 pages.

* cited by examiner

CABLE WITH LIGHTWEIGHT TENSILE ELEMENTS

CROSS-REFERENCE TO RELATED APPLICATIONS

This application is a national stage of International Application No. PCT/EP2016/073197, filed on Sep. 29, 2016, which is hereby incorporated by reference in its entirety.

TECHNICAL FIELD

The present invention relates to the field of cables.

BACKGROUND

Optical cables, power cables, umbilical cables or the like for submarine applications are well known in the art.

For the purpose of the present invention, unless otherwise specified, the terms "submarine cable", "cable for sub-sea applications" (or any similar language) or simply "cable" will include an elongated flexible element configured to transport power and/or telecommunication signals and/or one or more fluids. For the purpose of the present invention, unless otherwise specified, the term "cable" will include, for instance, power cable, optical cable, umbilical cable or any combination thereof.

The present invention is not limited to cables for submarine application and can be applied to other fields where tensile strength and lightweight are of importance. Indeed, lightweight is desirable in any cable but it is particularly desirable in suspended cables like those for elevators, wells or mining application.

During installation and operation, cables should sustain high tensile loads. For example, a submarine cable hangs off of the installation vessel from the surface of the water to the floor of the sea for many hundreds of meters with a consequent substantial tensile stress.

In addition, the payoff system of the installation vessel has to be commensurated to the weight of the cable to be deployed. The heavier the cable is, the stronger the gripping force of the payoff system needs to be. As the gripping force increases, the compression resistance of the cable also has to increase. Crush failure caused by gripping is a known failure mode.

It is known to provide tensile strength by the use of steel tensile members placed axially or, preferably, in a stranded arrangement around the cable structure to form an armor, as shown for example, in WO 2010/075873.

Tensile elements made of polymeric material have been proposed. Polymeric tensile elements are appealing as lighter than metallic tensile elements with analogous tensile resistance.

US 2012/0279750 discloses to high voltage power cable for ultra deep waters applications (at least 3000 meters under the sea level). The cable comprises an armor package comprising steel wires, but it may also contain composite materials consisting of aramid fiber, carbon fiber or similar. The armor package is applied with a lay-angle less than the lay-angle in the center bundle of the three power phases, the lay-angle in center bundle and armor package being controlled by one another. The cable comprises a longitudinal central element consisting of an elastic material, and longitudinal elements placed between the insulated conductors and consisting of polymer material. The central elastic element will function as soft bedding for the insulated conductors and will allow the said conductors to move towards center due to radial forces applied from the armor package and axial tensile load in the insulated conductors themselves. The polymer elements placed between the insulated conductors transfer the radial forces from the armor package on a large area and due to this the said insulated conductors themselves are not deformed significantly.

U.S. Pat. No. 4,059,951 discloses an electromechanical cable having individually jacketed non-metallic strain members. The jacket is preferably made of a formable plastic material, and the strain bearing portion of the composite strain member is preferably a bundle of yarns or fibers of aramid or the like. The outer circumferential layer of strain members are helically twisted to the left at an angle of about 18 degrees, while the inner circumferential layer of strain members are helically twisted to the right at an angle of about 18 degrees. In order to permit a longitudinal sliding movement of the strain bearing portion within the jacket, it is essential that either the strain bearing portion of the composite member (i.e., yarns or fibers) has a very slick external surface, or else it is necessary that the bundle of fibers or the like be lubricated at the external surface of the bundle.

U.S. Pat. No. 7,285,726 discloses an electrical subsea cable with a metal free sheath. The sheath is made of semiconducting polymeric material with a number of armoring elements of dielectric material, which are embedded in the sheath. The armoring elements consist of polyaramid fibers or fibers of highly oriented polyethylene. These bundles of such fibers are encompassed by a sheath of a polymeric material which preferably is semiconductive.

SUMMARY OF THE INVENTION

The present invention relates to the field of cables. Such cables can be employed, for instance, for submarine applications and more in particular for submarine applications in deep water. In particular embodiments, the present invention relates to a cable with an armor comprising lightweight tensile elements for providing tensile strength to a cable or the like.

The Applicant has tackled the problem of providing a cable configured for installations exerting a considerable tensile stress on the cable, and, more in general, the wish of having a lighter cable which is felt in vertical installations.

In the case of submarine cables, installations at high depths, for instance at depths of about 3000 m or more are sought.

In particular, the Applicant has faced the problem of providing a submarine cable with an armor made of polymeric tensile elements affording a limited elongation of the cable from since the very early stages of installation, thus allowing the cable deployment even at high depths. Such armor should be endowed with suitable compression (crush) resistance and suitable bending properties suitable for transport and deployment.

The Applicant has investigated diverse designs and arrangements of polymeric tensile elements. The Applicant has perceived that the ability of a cable to resist to high tensile stresses is increased when the armor comprising them has a reaction to the tensile stress application quicker than those of the other cable elements, in particular that of the cable conductors.

The Applicant has found that when the polymeric tensile elements of the armor are arranged according to low lay-loss, such quicker reaction can be attained with respect to cable components arranged radially outwardly or radially inwardly.

In the present description and claims, the expression "lay length" will indicate the longitudinal distance in which a stranded element arranged in helical path completes one circumferential turn, such length being measure along the helix axis.

In the present description and claims, the expression "lay loss" will indicate a percent difference between the lay length of a stranded element and the actual path length of the stranded element along its helix.

The Applicant experienced that, in the case of steel element armor, a low lay loss increases the tensional stability of the cable, but it gives rise to an increased bending stiffness making the coiling and the cable deposition difficult if not, in some instances, impossible to manage.

The Applicant found that an armor made of polymeric tensile elements wound with a lay loss of 1.5% at most provides the cable with a tensile stability suitable for the cable deployment even to sea depths of 3,000 m or more, while the bending features of the cable remain acceptable. Also, the Applicant found that a polymeric armor wound with such a low lay loss, when under tension, exerts negligible radial force to the underlying cable structure so that no cushioning elements or layers are needed.

According to a first aspect, the present invention provides a cable having a tensile armor comprising a plurality of elongated polymeric tensile elements, wherein at least one of the elongated polymeric tensile elements comprises a bundle of high tensile fibers and a polymeric jacket retaining said bundle of fibers, and the elongated polymeric tensile elements are arranged with a lay loss of 1.5% at most.

The cable can be an optical cable, a power cable or an umbilical cable. Preferably, the cable is for submarine applications.

Advantageously, the high tensile fibers comprise fibers having a Young modulus between 50 GPa and 200 GPa.

Preferably, the elongated polymeric tensile elements are arranged with a lay loss of 1.0% at most, more preferably from 0.4% to 0.9%.

In the case the cable of the invention comprises a plurality of cable cores stranded one another, the lay loss (and, accordingly the lay length and lay angle) of the elongated polymeric tensile elements of the invention is irrespective from the lay loss of the stranded cable cores.

The tensile armor of the cable of the invention can comprise a layer of elongated polymeric tensile elements. In some embodiments, the elongated polymeric tensile elements are provided in a single layer, in others they are provided in a two layer construction, as it will be shown in the following.

The Applicant has found that when the elongated polymeric tensile elements comprise fibers tightly arranged in the jacket, the tensile strength can be improved. Advantageously, the jacket of the elongated polymeric tensile element of the invention houses a bundle of high tensile fibers with a compaction (percentage of high tensile fiber volume with respect to the void space among the fibers) of from 55% to 90%, preferably of from 60% to 80%.

In embodiments of the invention, the jacket houses two bundles in direct contact one another.

The bundle may comprise unidirectional high tensile fibers, extending substantially along a longitudinal axis of the elongated polymeric tensile element.

In embodiments of the present invention, the high tensile fibers within the jacket have a density of from 0.9 to 3 g/cm3.

According to a second aspect, the present invention relates to a method of manufacturing a cable having a tensile armor comprising a layer of elongated polymeric tensile elements, wherein at least one of the elongated polymeric tensile elements comprises a bundle of high tensile fibers and a jacket retaining said bundle, the method comprising the stage of providing the layer of elongated polymeric tensile elements by winding them with a lay loss of 1.5% at most, preferably of from 1.0% at most.

Preferably, the cable of the invention lacks of extruded polymeric sheath in outer external position with respect to the tensile armor. The tensile armor can be protected by a serving layer made of wound yarns (semi-wet design).

BRIEF DESCRIPTION OF THE DRAWINGS

The present invention will become fully clear by reading the following detailed description, to be read by referring to the accompanying drawings, wherein.

DESCRIPTION OF EXAMPLES

In the present description and claims, unless otherwise specified, all the numbers and values should be intended as preceded by the term "about". Also, all ranges include any combination of the maximum and minimum points disclosed and include any intermediate ranges therein, which may or may not be specifically enumerated herein.

For the purpose of the present description and of the appended claims, the words "a" or "an" are used to describe elements and components of the invention. This is done merely for convenience and to give a general sense of the invention. In this description and claims should be read to include one or at least one and the singular also includes the plural unless it is obvious that it is meant otherwise.

The present invention relates to an elongated light weight polymeric tensile element for a cable, to a cable supporting high tensile stresses comprising such an elongated tensile member and a method of manufacturing such a cable. More specifically, the elongated polymeric tensile element is configured for being assembled in an armor of any of an optical cable, a power cable, an umbilical cable (or the like), in particular, but not only, for submarine applications. The present invention also includes an optical cable, a power cable, an umbilical cable (or the like) in particular, but not only, for submarine applications comprising one or more elongated polymeric tensile elements.

Figure 1A:
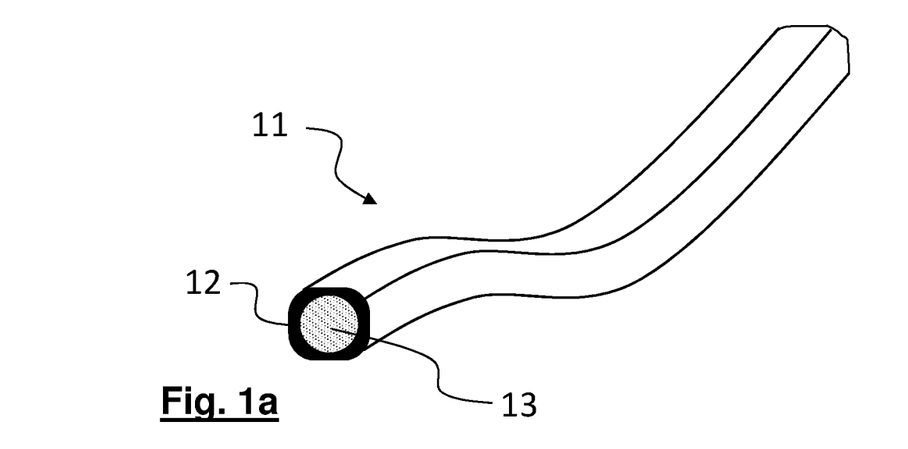
FIGS. 1a and 1b are diagrammatic views of two polymeric tensile elements according to embodiments of the present invention.
Figure 1B:
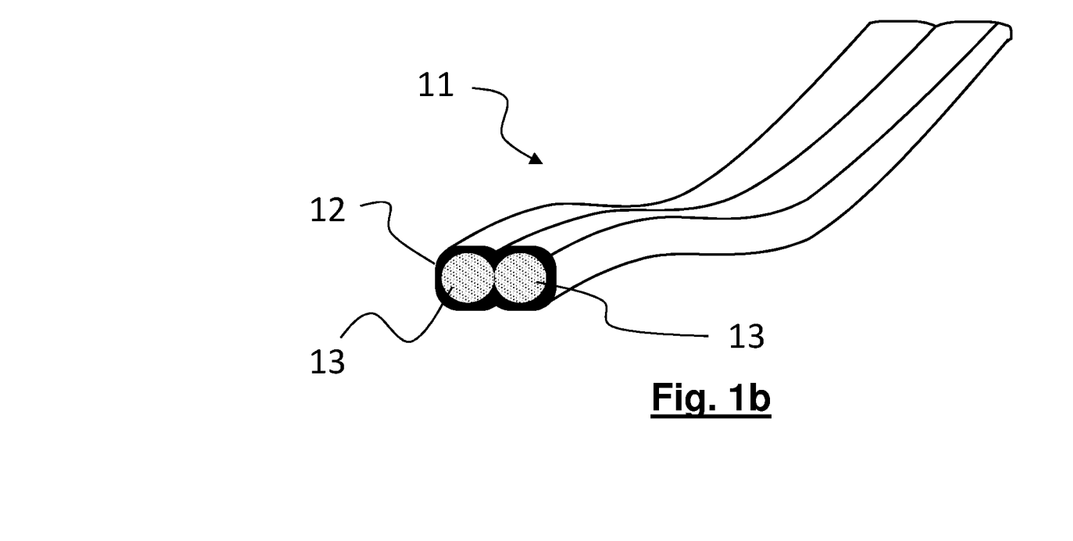

According to one embodiment, as shown in FIG. 1a, the elongated polymeric tensile element ii according to the present invention comprises a bundle 13 of high strength fibers and a jacket 12 compactly retaining such a bundle 13. In other embodiments, as shown in FIG. 1b, a single jacket 12 is configured for retaining two bundles 13 of fibers housed adjacent and in direct contact one another. In the following of the description this two-bundle configuration is also referred to as "twin bundle."

The jacket 12 is preferably an extruded tube made of polyethylene (PE), polypropylene (PP) or a similar material.

The jacket can have a wall thickness between 0.3 mm and 1.8 mm, preferably from 0.5 mm and 1.5 mm.

The bundle 13 of fibers advantageously comprises unidirectional high tensile fibers, extending substantially along a longitudinal axis of the elongated polymeric tensile element.

The bundle 13 preferably comprises fibers made of a material having a Young's modulus between 50 GPa and 200 GPa.

For example, the fibers of the bundle 13 are aramid fibers. Preferably, such fibers have a Young's modulus between 130 GPa and 179 GPa. Aramid fibers are deemed to be preferred in view of their highly favorable rate between elastic modulus and weight.

In other embodiments, the bundle of the invention can comprise fibers of ultra-high molecular weight polyethylene (UHMwPE), such as, for instance, Dyneema® manufactured by DSM Dyneema B. V., Geleen, The Netherlands. Suitably, such fibers have a Young's modulus between 55 GPa and 172 GPa.

In other embodiments, the bundle of the invention can comprise liquid crystal polymer (LCP), such as, for instance, Vectran® manufactured by Kuraray Co., Ltd., Osaka, Japan.

The Applicant has performed several tests and has concluded that density of yarns in the jacket can be a critical issue for reducing slack of the high tensile fibers within the jacket. According to preferred embodiments, the density of fibers should be in a range of from 0.9 to 3.0 g/cm3.

The Applicant has performed several tests and has concluded that also compaction of fibers in the jacket can be a critical issue for reducing slack of the fibers within the jacket. According to the present invention, compaction of fibers is expressed in terms of linear mass density of fibers by cross sectional area. More specifically, tex is used for linear mass density of fibers and square millimeters (mm²) is used for cross sectional area. Tex is a unit of measure for the linear mass density of fibers and is defined as the mass in grams per 1000 meters. The unit code is "tex". The most commonly used unit is actually the decitex (abbreviated dtex), which is the mass in grams per 10,000 meters.

Advantageously, the bundle of the present elongated polymeric tensile elements contains fibers with a compaction of from 55% to 90%, preferably from 60% to 80%.

A plurality of elongated polymeric tensile elements according to the present invention is disposed for providing a cable armor. More in detail, a plurality of elongated polymeric tensile elements, arranged side-by-side in a circle arrangement, is used for forming a single tensile armor layer. A further tensile armor layer is provided so that a double layer armor is formed. Preferably, the helical windings of the second tensile armor layer extend along a winding direction which is opposite to the winding direction of the helical windings of the first tensile armor layer with respect to the longitudinal axis, so as to define a crossed configuration. Preferably, the helical windings of the first and second tensile armor layers are laid with substantially the same pitch, in opposite directions, so as to prevent cable rotations under axial load.

According to the present invention, each of the plurality of elongated polymeric tensile elements according to the present invention is arranged according to a given lay loss. Preferably, lay loss of the elongated polymeric tensile elements forming each of the armor layers is of from 0.5% to 2.0%. According to a preferred embodiment, lay loss is between 0.5% and 1.0%.

Figure 2:
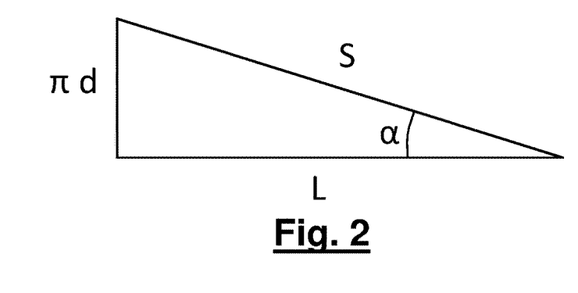
FIG. 2 is a schematic representation of helix angle α, lay length L and helix length a d.

Lay loss is a function of helix angle α, as it will be shown by the following equations and having reference to the schematic drawing of FIG. 2, wherein α=helix angle, L=Lay length, d=helix diameter, and S=helix length $$\pi d = L \tan\alpha$$

$$\alpha = \arctan\left(\frac{\pi d}{L}\right)$$

$$S = \sqrt{L^2 + (\pi d)^2} - 1$$

$$\frac{L}{d} = \frac{\pi}{\tan\alpha}$$

$$\cos\alpha = \frac{1}{\text{lay loss} + 1}$$

Figure 3:
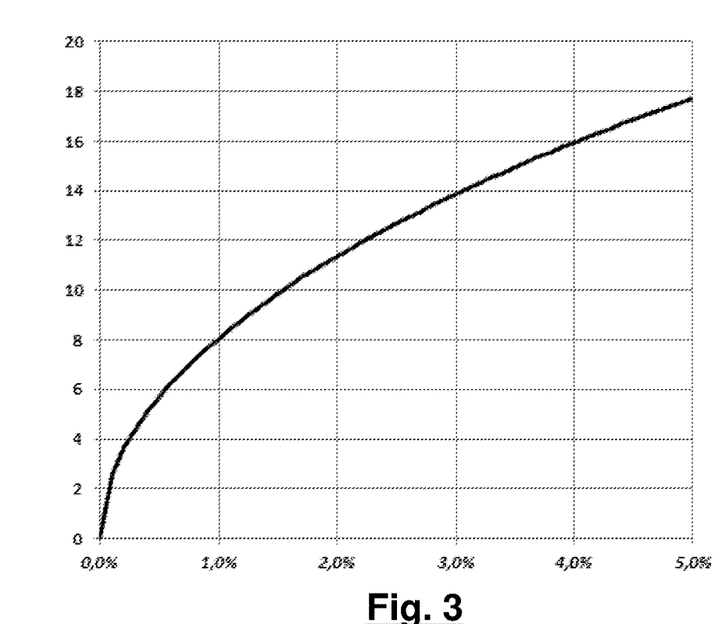
FIG. 3 is a graph showing the relationship between lay loss and helix angle.

The graph of FIG. 3 shows how the lay loss (%, in abscissa) varies according to variations of the helix angle α (degrees, in ordinate). The graph shows that, according to the range of lay loss of the elongated polymeric tensile elements of the present invention, the helix angle is lower than 12° and is preferably between 6° and 8°.

A prototype of armored single core cable (FIG. 4) according to an embodiment of the present invention has been manufactured and tested. In particular the cable armor was made with a plurality of elongated strength elements according to the embodiment of FIG. 1a.

Figure 4:
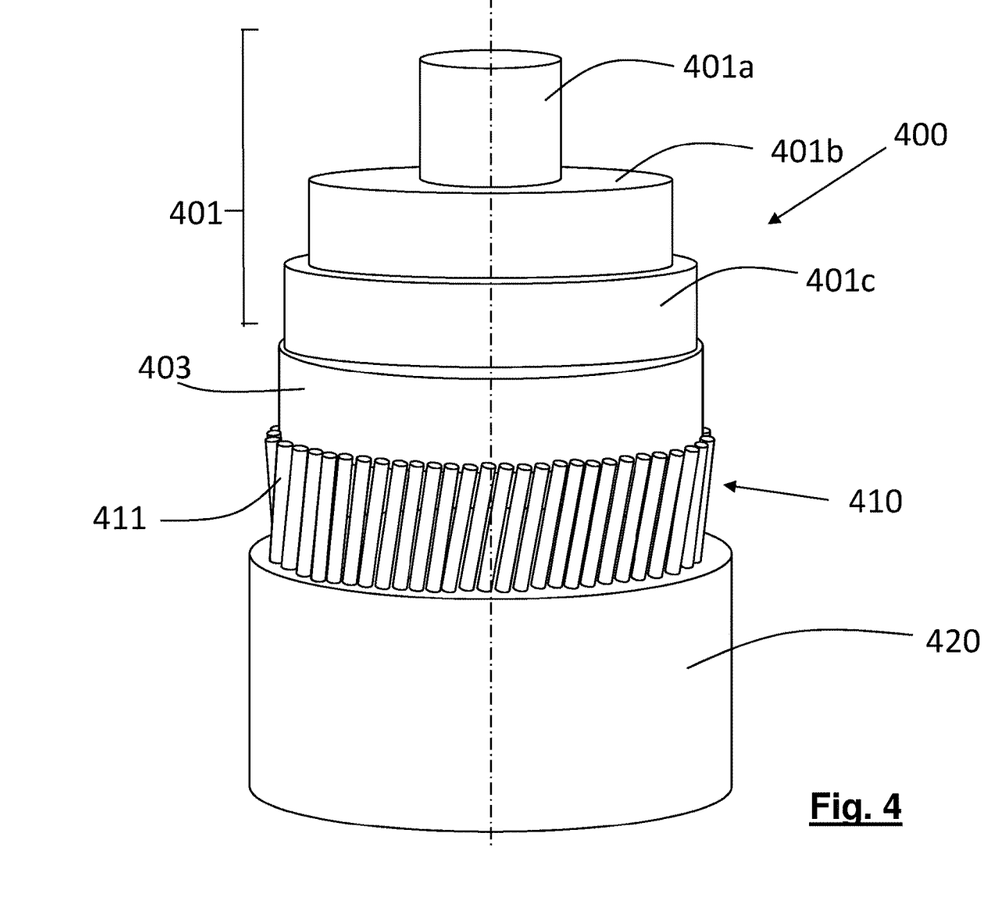
FIG. 4 is an axonometric view of armored single-core power cable.

FIG. 4 shows an armored single core power cable 400 suitable for submarine deployment. Cable 400 comprises a single insulated conductive core 401 comprising an electric conductor 401a, an insulation system 401b (made, in turn by an inner semiconducting layer surrounded by an insulation layer surrounded by an outer semiconducting layer) and a screen 401c. In particular the screen 401c can be a hermetic metal sheath made, for example, of lead or copper.

The core 401 is surrounded by a lead layer 403. Around the lead layer 403 a tensile armor 410, comprising at least one layer of elongated polymeric tensile elements 411 according to the invention, is provided. Optionally a separating sleeve (not illustrated and made, for example, of polyethylene) is interposed between lead layer 403 and tensile armor 410 for preserving the lead surface from scratching. Preferably, a serving layer 420 surrounds the armor 410, the layer 420 being made, for example, of polypropylene yarn.

The tensile armor 410 is configured to withstand longitudinal tensile forces which the power cable 400 may be subjected to in operation. The elongated polymeric tensile elements 411 preferably extend parallel to each other in a helix coaxial with the cable longitudinal axis X-X. While the elongated polymeric tensile elements 411 of FIG. 4 have a substantially circular cross-section (as the cross-section of the elongated elements of FIG. 1a), the prototype cable was manufactured with elongated polymeric tensile elements having a substantially rectangular cross-section, as shown in FIG. 1b.

The Applicant has manufactured a plurality of elongated polymeric tensile elements for the armor of the cable 400. Each single elongated polymeric tensile element 411 comprised two separate bundles of fibers and one single jacket around the twin bundles, like that of FIG. 1b.

Each bundle of fibers comprised aromatic polyamide (aramid) fibers manufactured by Teijin Aramid, Arnhem, The Netherlands. In particular, the fibers used were Twaron aramid fibers.

For example, yarns with 1000 fibers and 1610 dtex were first made. Six of these first yarns were bundled together. Each bundle therefore included 6000 fibers and had 9660 dtex.

Then, a yarn unit was made. The unit consisted of nineteen bundles as set forth above. Therefore, 19×9,660 dtex=183,540 dtex. The above 183,540 dtex yarn was finally used for making a 5 mm diameter bundle. Said 5 mm diameter bundle has a cross sectional area of 19.63 mm$^2$, therefore the bundle has 9348 dtex/mm$^2$. This corresponds to a compaction of about 65%.

The fibers in the bundles and the bundles themselves were provided into the jacket substantially parallel to the longitudinal axis of the elongated polymeric tensile element.

The Applicant has manufactured and tested further cables having diverse compaction of from 55% to 90%. Values of compaction lower than 55% resulted in a rather low promptness of the armor to take the tensile forces applied to the cable, for instance the load of a length of submarine cable when it is deployed in very deep water. Values of compaction within the range of the invention resulted in a satisfactory performance in terms of promptness of the armor to take the tensile forces applied to the cable so that the cable core did not suffer from potentially harmful tensile stresses.

In the tested cables, two of these 5 mm bundles were placed next to one another and jacketed simultaneously to form a 7 mm×12 mm dual bundle elongated polymeric tensile element, similar to that depicted in FIG. 1b.

Two layers of these twin bundle elongated polymeric tensile elements were stranded around the cable core. The first layer comprising 28 twin bundle elongated polymeric tensile elements. The second layer comprising 31 twin bundle elongated polymeric tensile elements.

In a first configuration, the lay loss of the twin bundle elongated polymeric tensile elements of the first and second layers was 0.90% corresponding to a helix angle α of 7.7°.

In a second configuration, the lay loss of the twin bundle elongated polymeric tensile elements of the first and second layers was 0.50% corresponding to a helix angle α of 5.7°.

The Applicant has evaluated also materials other than aramid fibers which could be suitable for making a fiber bundle for an elongated polymeric tensile element of an armored cable according to the present invention.

The Applicant has concluded that other high strength polymer fibers are acceptable as well as inorganic fibers such as glass fibers.

Preferably, the fibers within the jacket are not chemically bounded to the jacket.

Alternately, the interstices of the fibers could be filled with a flexible polymer or gel. However, the Applicant believes that embedding the fibers in any matrix affects the flexibility of the subunit and the finished cable.

The outer jacket on the subunits could be made of various grades of PE such as HDPE (high density polyethylene) or from other thermoplastic or thermoset resins such as polyurethane, thermoplastic elastomers, etc.

According to preferred embodiments, a layer of adhesive can be applied to the outer surface of the jacket of the elongated polymeric tensile element of the present invention. In this way, the jacket and the protective outer layer or serving made of polypropylene yarns which is radially outer with respect to the armor layer can be mechanically congruent one another. This reduces slack of the jacket with respect to the protective layers which are in contact therewith and ease the cable handling especially at the ends thereof.

Preferably, the layer of adhesive is sprayed on the outer surface of the jacket. It is preferable that the adhesive remains in a melt state for a time sufficient to lay the elongated polymeric tensile element on inner protective layer and to apply an outer protective layer thereon. A suitable adhesive material can be Instaweld 6615E (National Starch & Chemical AB).

The adhesive layer can be applied on the inner protective layer and on any of the tensile armor layer.

The elongated polymeric tensile element according to the present invention can be used for other cables other than the cable of FIG. 4. For instance, it can be used for forming a single layer armor in the three-core power cable of FIG. 5.

Figure 5:
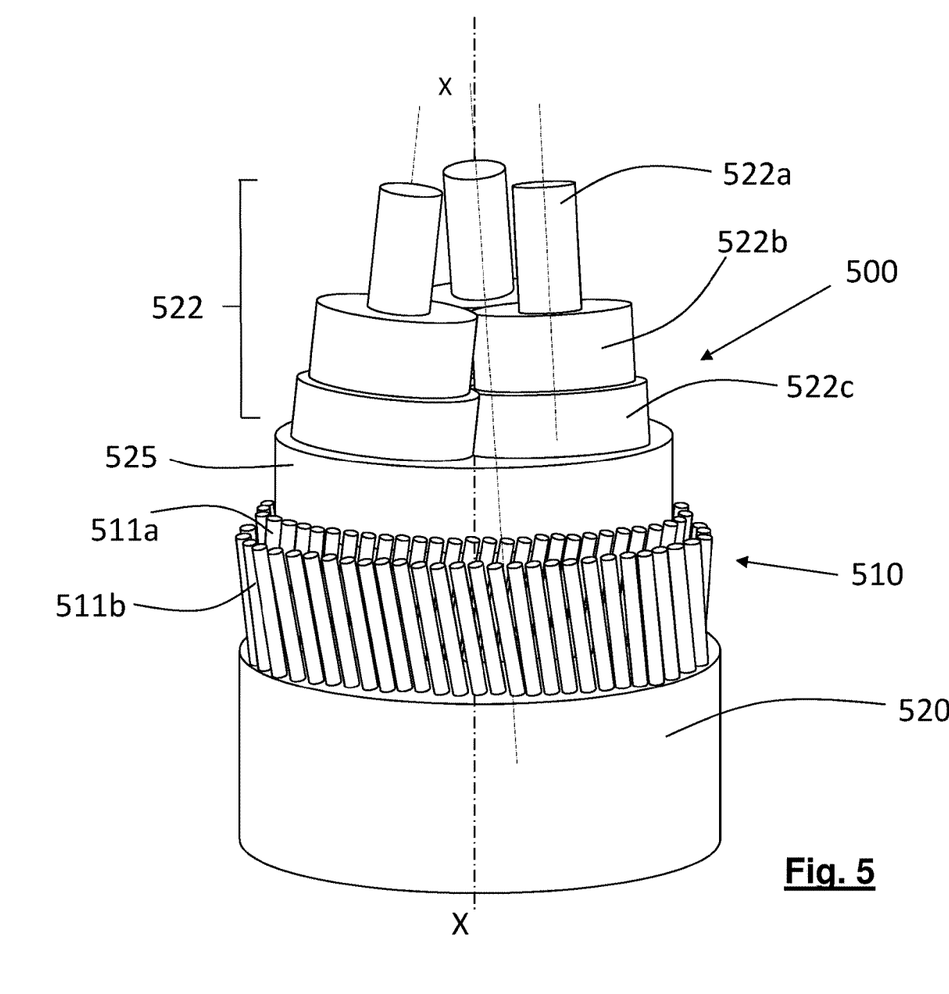
FIG. 5 is an axonometric view of an armored three-core power cable.

FIG. 5 shows an armored three-core power cable 500 suitable for submarine deployment. Cable 500 comprises three stranded (S-, Z- or SZ-stranded) insulated conductive cores 522, each comprising an electric conductor 522a, an insulation system 522b (made, in turn by an inner semiconducting layer surrounded by an insulation layer surrounded by an outer semiconducting layer) and a screen 522c. The screen 522c can have a construction analogous to that of screen 401c of FIG. 4.

The cores 522 are surrounded by a lead layer 525. Around the lead layer 525, a double layer tensile armor 510, comprising two layers of elongated polymeric tensile elements 511a and 511b according to the invention, is provided. Between the layer of elements 511a and the layer of elements 511b a separating layer (not illustrated and made, for example, of polyethylene or semiconductive polymer material) can be provided for preserving the lead surface from scratching. Preferably, a serving layer 520 surrounds the armor 510, the layer 520 being made, for example, of polypropylene yarn.

The tensile armor 510 is configured to withstand to the longitudinal tensile forces which the power cable 500 may be subjected to in operation. The elongated polymeric tensile elements 511a and 511b of the same layer extend parallel to each other in a helix coaxial with the cable longitudinal axis X-X, with a lay loss between 0.5% and 2.0%. As shown in FIG. 5, the elongated polymeric tensile elements 511a and 511b are wound at substantially the same winding angle, but with opposite direction.

While the polymeric tensile elements 511a, 511b of FIG. 5 have a circular cross-section, they can also have a substantially rectangular cross-section, as shown in FIG. 1b.

Figure 6:
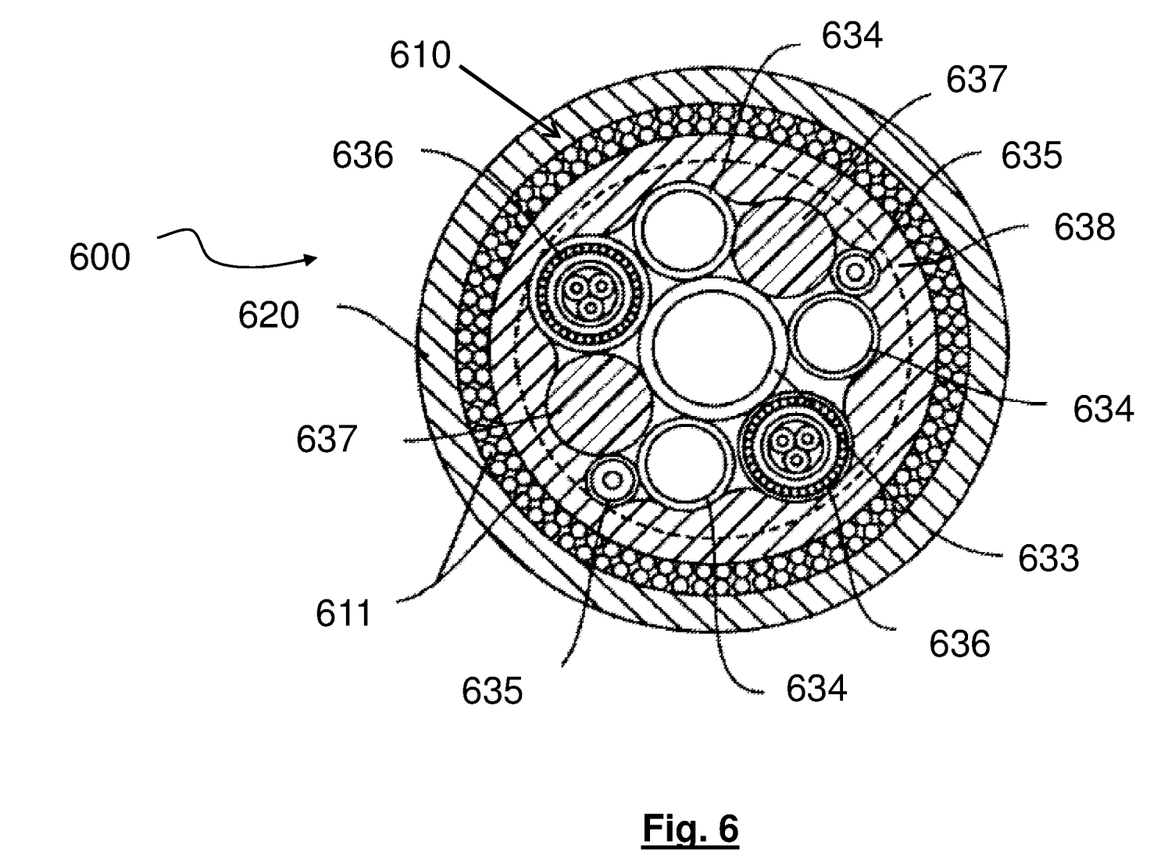
FIG. 6 is a cross section of an armored umbilical cable.

FIG. 6 is a cross-section of an umbilical cable 600. The umbilical cable 600 comprises a central core 633 made of steel for transporting a fluid. Disposed around the central core 633 are three steel tubes 634 for transporting a fluid; two optical fiber cables 635; two screened three-core electric cables 636; two thermoplastic fillers 637; and a filler 638. Around the filler 638 two layers of counter-helically wound elongated polymeric tensile elements 611 according to the invention are provided. The two layers of elongated polymeric tensile elements 611 constitute the tensile armor 610 of the umbilical cable 600. A serving layer 620 surrounds the armor 610, the layer 620 being made, for example, of polypropylene yarn. While the polymeric tensile elements 611 of FIG. 6 have a circular cross-section, they can also have a substantially rectangular cross-section, as shown in FIG. 1b.

The Applicant evaluated the conductor elongation at a load of 50 tons of cables A and B having armors made of polymeric tensile elements wound with different lay losses. The cables A and B had a single core and substantially the same dimensions and construction.

The maximum elongation tolerated by the cores of cables A and B was of 0.25%.

In a cable A with an armor having polymeric tensile elements wound with a lay loss of 0.7%, the conductor elongation was lower than 0.25%, while in a cable B with an armor having polymeric tensile elements wound with a lay loss of 3%, the conductor elongation was of nearly 0.3%.

With the goal of reaching a cable core elongation of 0.25% at most during laying, cable A can be deposited at a sea depth of about 3,400 m, while cable B can be deposited at a sea depth of 2,800 m at most.

Cable A of the invention reaches a core elongation of 0.25% under a greater load than cable B, thus a greater weight and, accordingly, a greater length portion of cable A can be suspended from, for example, a ship to reach the seabed.

A cable according to the invention had a bending stiffness significantly lower than a cable with substantially the same dimensions and construction, but with an armor made of steel.

The invention claimed is:

1. A cable suitable for submarine deployment, the cable comprising:
   an insulated conductive core comprising an electric conductor, an insulation layer surrounding the electrical conductor, and a hermetic metal sheath surrounding the insulation layer;
   a tensile armor surrounding the insulated conductive core, the tensile armor comprising a plurality of elongated polymeric tensile elements; and
   a serving layer surrounding and in physical contact with the tensile armor;
   wherein each of the elongated polymeric tensile elements comprises bundles of high tensile fibers and a jacket tightly retaining the bundles of high tensile fibers, wherein a portion of the jacket partially separates the bundles of high tensile fibers;
   wherein at least one of the elongated polymeric tensile elements is arranged with a lay loss between 0.4% and 1.0%;
   wherein the jacket houses the bundles of high tensile fibers with a compaction between 55% and 90%;
   wherein the high tensile fibers comprise fibers have a Young modulus between 50 GPa and 200 GPa; and
   wherein a density of the high tensile fibers within the jacket is between 0.9 g/cm$^3$ and 3 g/cm$^3$.

2. The cable of claim 1, wherein the elongated polymeric tensile elements are arranged with a lay loss from 0.4% to 0.9%.

3. The cable of claim 1, wherein each of the bundles comprises unidirectional high tensile fibers, extending substantially along a longitudinal axis of the elongated polymeric tensile elements.

4. The cable of claim 3, wherein the tensile armor comprises a layer of the elongated polymeric tensile elements wound around the insulated conductive core.

5. The cable of claim 1, wherein the jacket houses the bundle of high tensile fibers with a compaction between 60% and 80%.

6. The cable of claim 1, wherein one of the bundles of high tensile fibers is partially in contact with another one of the bundles of high tensile fibers.

7. The cable of claim 1, wherein the bundles of high tensile fibers comprise a first bundle of high tensile fibers and a second bundle of high tensile fibers directly contacting the first bundle of high tensile fibers at a contact region, the portion of the jacket partially separating the first bundle of high tensile fibers from the second bundle of high tensile fibers.

8. The cable of claim 7, further comprising another portion of the jacket partially separating the first bundle of high tensile fibers from the second bundle of high tensile fibers, the another portion being separated from the portion by the contact region.

9. A cable comprising:
   a core that includes a cable element selected from the group consisting of an optical cable element, a power cable element, and an umbilical cable element;
   a tensile armor comprising a plurality of elongated polymeric tensile elements disposed in an annular region surrounding the core, wherein at least one of the elongated polymeric tensile elements comprises bundles of high tensile fibers and a jacket tightly retaining the bundles of high tensile fibers, wherein a portion of the jacket partially separates the bundles of high tensile fibers, wherein the elongated polymeric tensile elements are arranged in the annular region with a lay loss between 0.4% and 1.0% and no elongated polymeric tensile elements are arranged outside the annular region and wherein the high tensile fibers are unidirectional, extending substantially along a longitudinal axis of the elongated polymeric tensile elements; and
   a serving layer surrounding the annular region and physically touching at least some of the elongated polymeric tensile elements.

10. The cable of claim 9, wherein the high tensile fibers comprise fibers having a Young modulus between 50 GPa and 200 GPa.

11. The cable of claim 9, wherein the jacket houses the bundles of high tensile fibers with a compaction between 55% and 90%.

12. The cable of claim 9, wherein the high tensile fibers within the jacket have a density between 0.9 g/cm$^3$ and 3 g/cm$^3$.

13. The cable of claim 9, wherein the core comprises:
   an insulated conductive core comprising an electric conductor;
   an insulation layer surrounding the electrical conductor; and
   a hermetic metal sheath surrounding the insulation layer.

14. The cable of claim 9, wherein the core comprises:
   a steel tube capable of transporting fluid;
   an optical fiber cable;
   an insulated electric core; and
   a plurality of fillers.

15. The cable of claim 9, further comprising a separating sleeve interposed between the core and the tensile armor.

16. The cable of claim 9, wherein the plurality of elongated polymeric tensile elements are a first plurality of elongated polymeric tensile elements, wherein the cable further comprises a second plurality of elongated polymeric tensile elements disposed in the annular region, wherein at least one of the second plurality of elongated polymeric tensile elements comprises further bundles of high tensile fibers and a second jacket tightly retaining the further bundles of high tensile fibers, wherein the second plurality of elongated polymeric tensile elements are arranged in the annular region with a helix angle in opposing direction to a helix angle of the first plurality of elongated polymeric tensile elements, the second plurality of elongated polymeric tensile elements being arranged with a lay loss between 0.4% and 1.0%.

17. The cable of claim 9, wherein one of the bundles of high tensile fibers is partially in contact with another one of the bundles of high tensile fibers.

18. The cable of claim 9, wherein the bundles of high tensile fibers comprise a first bundle of high tensile fibers and a second bundle of high tensile fibers directly contacting the first bundle of high tensile fibers at a contact region, the portion of the jacket partially separating the first bundle of high tensile fibers from the second bundle of high tensile fibers.

19. The cable of claim 18, further comprising another portion of the jacket partially separating the first bundle of high tensile fibers from the second bundle of high tensile fibers, the another portion being separated from the portion by the contact region.

* * * * *